United States Patent
Calvelo Aros et al.

(10) Patent No.: US 9,317,391 B2
(45) Date of Patent: Apr. 19, 2016

(54) LOGGING GRAPHICAL USER INTERFACE EVENTS

(71) Applicant: Google Inc., Mountain View, CA (US)

(72) Inventors: Daniel Calvelo Aros, Zurich (CH); Christoph Urs Oehler, Lucerne (CH)

(73) Assignee: Google Inc., Mountain View, CA (US)

( * ) Notice: Subject to any disclaimer, the term of this patent is extended or adjusted under 35 U.S.C. 154(b) by 592 days.

(21) Appl. No.: 13/648,214

(22) Filed: Oct. 9, 2012

(65) Prior Publication Data
US 2015/0169187 A1    Jun. 18, 2015

(51) Int. Cl.
*G06F 3/0484*    (2013.01)
*G06F 11/34*    (2006.01)
*G06F 11/30*    (2006.01)
*G06F 17/30*    (2006.01)

(52) U.S. Cl.
CPC .......... *G06F 11/3438* (2013.01); *G06F 11/302* (2013.01); *G06F 11/3476* (2013.01); *G06F 11/3495* (2013.01); *G06F 17/30861* (2013.01); *G06F 2201/86* (2013.01); *G06F 2201/875* (2013.01)

(58) Field of Classification Search
CPC ......... G06F 3/00; G06F 3/048; G06F 3/0481; G06F 3/0482; G06F 3/14; G06F 3/04842; G06F 8/38; G06F 17/30867; G06F 9/4443; G06F 9/4446; G06F 11/30; G06F 11/302; G06F 11/3438; G06F 11/34; G06F 15/16; H04L 29/06; H04L 29/0809; G06Q 10/10
See application file for complete search history.

(56) References Cited

U.S. PATENT DOCUMENTS

| | | | |
|---|---|---|---|
| 6,018,619 A | 1/2000 | Allard et al. | |
| 7,467,356 B2 * | 12/2008 | Gettman et al. | 715/850 |
| 8,984,441 B2 * | 3/2015 | Eyer et al. | 715/811 |
| 2005/0044508 A1 * | 2/2005 | Stockton | 715/811 |
| 2006/0274763 A1 | 12/2006 | Error | |
| 2010/0095218 A1 * | 4/2010 | Ospalik et al. | 715/745 |
| 2010/0268759 A1 | 10/2010 | Hepper et al. | |
| 2014/0096081 A1 * | 4/2014 | Carpenter et al. | 715/825 |
| 2014/0108208 A1 * | 4/2014 | Piana | 705/27.2 |

* cited by examiner

*Primary Examiner* — Xiomar L Bautista
(74) *Attorney, Agent, or Firm* — Dority & Manning, P.A.

(57) ABSTRACT

The disclosed subject matter relates to computer implemented methods for logging graphical user interface events. In one aspect, a method includes receiving from a server, an identifier for a user interface element of a graphical user interface. The method further includes detecting a user interface event associated with the user interface element. The user interface event associated with the user interface element can be an operation performed on the user interface element or an effect caused by the operation performed on the user interface element. The method further includes entering into a log, the identifier for the user interface element and the user interface event associated with the user interface element. The method further includes sending the log to the server.

6 Claims, 7 Drawing Sheets

LOGGING GRAPHICAL USER INTERFACE EVENTS

BACKGROUND

A computer user typically interacts with a client-server application via a graphical user interface ("GUI") installed on a client computing device. In the course of this interaction, the user can perform a variety of actions using input devices such as a mouse and a keyboard. Understanding the user's actions and the corresponding effects can assist in understanding how the user interacts with the application.

SUMMARY

The disclosed subject matter relates to a computer-implemented method for logging client-side events of a graphical user interface for a client-server application. The method includes displaying on a client device, a graphical user interface for a client-server application. The graphical user interface includes a plurality of user interface elements. Each of the plurality of user interface elements has an identifier. The identifiers are communicated to the client device by a server. The method further includes detecting a first user interface event including a user interaction with a first user interface element of the plurality of user interface elements. The method further includes generating a first log entry in a log stored on the client device. The first log entry includes the first user interface event and the respective identifier associated with the first user interface element. The method further includes updating at least one of the plurality of user interface elements in the displayed graphical user interface in response to the first user interface event. A second user interface event includes the updating of the at least one of the plurality of user interface elements in the displayed graphical user interface. The method further includes generating a second log entry in the log stored on the client device. The second log entry includes the second user interface event and the respective identifier for each of the at least one of the plurality of user interface elements updated in the second user interface event. The method further includes sending the log stored on the client device to the server.

The disclosed subject matter further relates to a computer-implemented method for logging graphical user interface events. The method includes receiving from a server, an identifier for a user interface element of a graphical user interface. The method further includes detecting a user interface event associated with the user interface element. The user interface event associated with the user interface element can be an operation performed on the user interface element or an effect caused by the operation performed on the user interface element. The method further includes entering into a log, the identifier for the user interface element and the user interface event associated with the user interface element. The method further includes sending the log to the server.

The disclosed subject matter further relates to a computer-implemented method for logging graphical user interface events. The method includes generating an identifier for a user interface element of a graphical user interface. The method further includes providing the identifier to a logging component on a client device. The logging component is configured to detect and enter into a log, a user interface event associated with the user interface. The method further includes receiving the log from the logging component. The method further includes replaying, based on the received log, the user interface event associated with the user interface element.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative, and not restrictive in nature.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Many applications have a client-server implementation. In a client-server implementation, some of the software instructions can be executed on a server, where the application may be hosted, and some of the software instructions can be executed on a client device accessing the application.

The execution of some of the software instructions on the client computing device can occur without a data request being sent to the server. Thus, a logging method implemented solely on the server ("server-only implementation") can not detect and log all the events that occur on the client device. Consequently, the log(s) generated by the server-only implementation can not be used to replay all the events that occurred on the client device.

The subject technology relates to logging graphical user interface events that occur on a client device accessing a client-server application. One example of a client-server application is a web-based application, which may also be referred to as a web-application.

The subject technology involves displaying a graphical user interface for the client-server application, on a client device. The graphical user interface includes user interface elements. Each of the user interface elements have identifier.

The identifiers associated with the user interface elements are generated at a server. The identifiers are then communicated to the client device by the server. The client device accessing the client-server application, includes a logging component that can receive the identifiers communicated by the server.

The logging component detects user interface events associated with the user interface elements of the graphical user interface. A user interface event can include a user interaction with a user interface element. In response to that user interaction, that same user interface element, or a different user interface element may be updated, based on the underlying software instructions of the graphical user interface. For example, a user interface element may be updated to be displayed at a different location within the graphical user interface, may no longer be visible within the graphical user interface, and/or may be made visible within the graphical user interface. That is, an update can include a change in appearance, visibility, size, and/or location of one or more user interface elements.

The updating of the same user interface element, or the different user interface element, is also a user interface event which is detected by the logging component.

Either, or both user interface events may occur in a manner that they are not directly communicated to the server. That is, either one or both the user interface events may be purely client-side user interface events.

For each detected user interface event, the logging component generates a log entry, which is stored in a log on the client device. Each log entry includes the user interface event, and the respective identifier. Thus, in a case where a user interaction with a first user interface element causes a change in a second user interface element, two separate user interface events are generated by the logging component, and stored in the log.

The logging component can be configured to detect and/or generate into the log, specific types of user interface events at specific frequencies.

The log is sent from the client device to the server. The log may be stored at the server. The log may be used to replay user interface events recorded therein. For example, an administrator may use the log to replay one or more of the user interface events. Replaying the user interface events can provide insight into a user's interaction with the graphical user interface of the client-server application. As an example, the log may be used to determine how often a particular user interface element (e.g., a menu item) is used.

Figure 1:
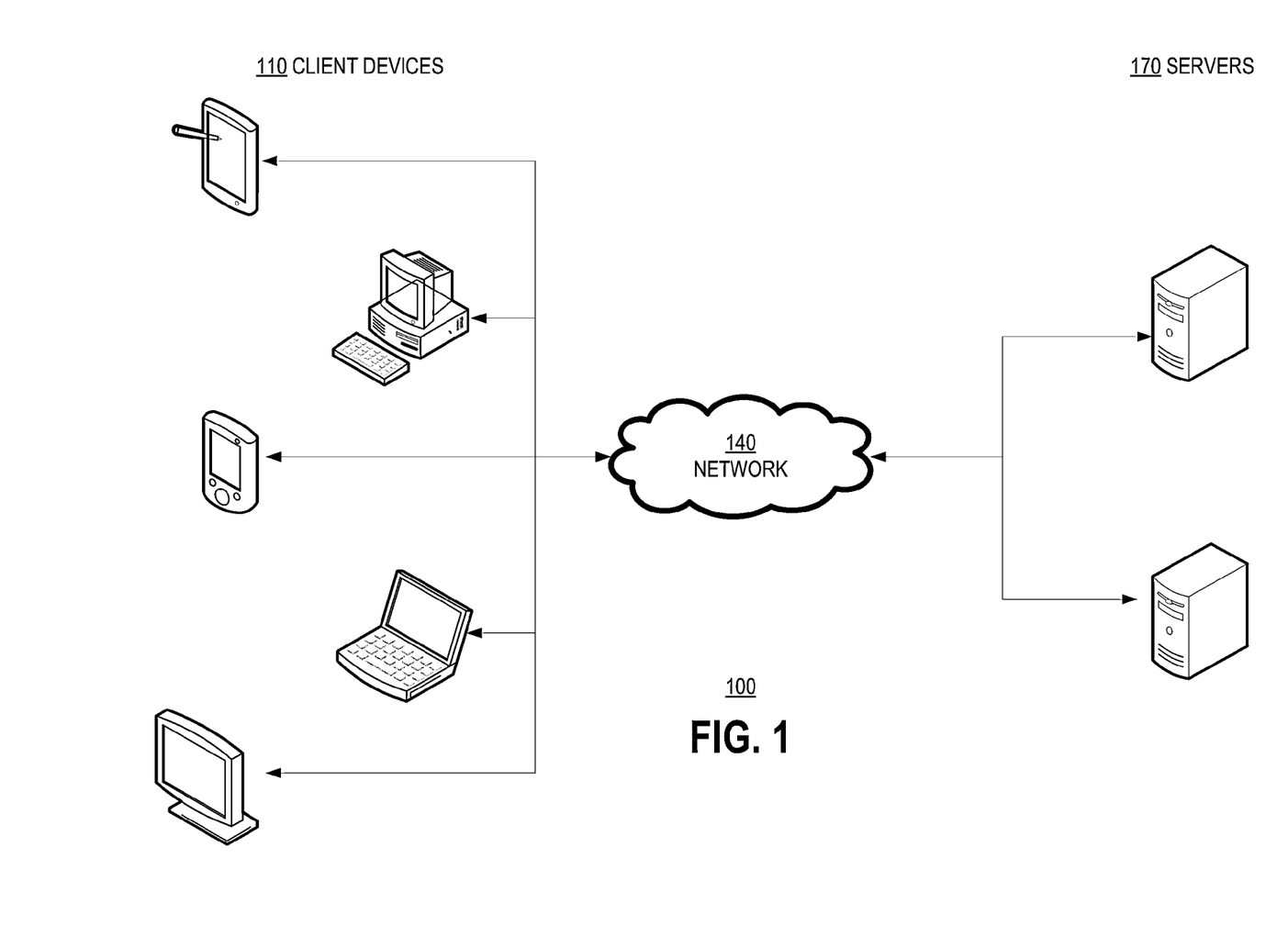
FIG. 1 illustrates an example of an architecture for logging graphical user interface events.

FIG. 1 illustrates an example of an architecture for logging graphical user interface events. The architecture 100 includes client devices 110 and servers 170 connected over a network 140.

The client devices 110 can be, for example, mobile computers, tablet computers, mobile devices (e.g., a smartphone or PDA), desktop computers, set top boxes (e.g., for a television), video game consoles, or any other devices having appropriate processing capabilities, communications capabilities, and memory. Each client device 110 is configured to include an input device for accepting user input, and an output device to display information to the user.

The client devices 110 can be connected to the network 140. The network 140 can include any one or more of a personal area network (PAN), a local area network (LAN), a campus area network (CAN), a metropolitan area network (MAN), a wide area network (WAN), a broadband network (BBN), the Internet, and the like. Further, the network 140 can include, but is not limited to, any one or more of the following network topologies, including a bus network, a star network, a ring network, a mesh network, a star-bus network, tree or hierarchical network, and the like.

The servers 170 can be for example, stand-alone servers, shared servers, dedicated servers, cluster/grid servers (e.g., a server farm), or cloud servers. Each of the servers 170 may include one or more processors, communications modules, and memory. The servers 170 may be configured to distribute workload (e.g., for loadbalancing) across multiple servers.

Figure 2:
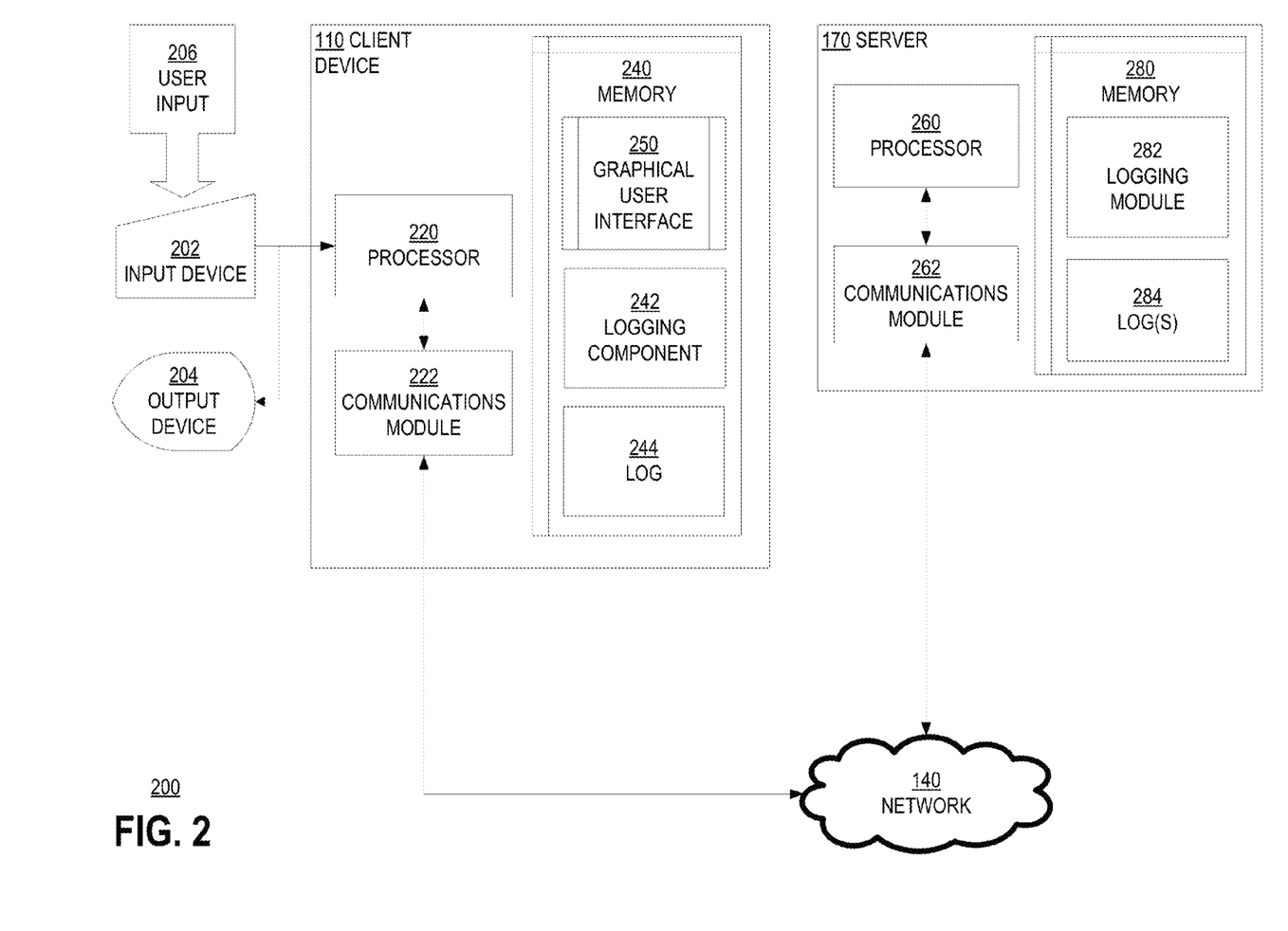
FIG. 2 illustrates a block diagram using an example of a client device and a server in the architecture of FIG. 1 according to certain aspects of the disclosure.

FIG. 2 is a block diagram 200 illustrating an example of a client device 110 and a server 170 in the architecture 100 of FIG. 1 according to certain aspects of the disclosure.

The client device 110 includes an input device 202, an output device 204, a processor 220, a communications module 222, and memory 240. The input device 202 can be a touchscreen, a mouse, a keyboard, or any other device to enable a user to supply input 206 to the client device 110. The output device 204 can be a display screen. Input 206 received via the input device 202 can be processed locally on the client device 110 and/or the server 170.

The client device 110 is connected to the network 140 via a communications module 222. The communications module 222 is configured to interface with the network 140 to send and receive information, such as data, requests, responses, and commands to other devices on the network 140. The communications module 222 can be, for example, a modem or Ethernet card.

The memory includes a graphical user interface 250 for a client-server application. The graphical user interface 250 can include several user interface elements. The graphical user interface 250 of the client-server application may be downloaded from the server 170 and/or installed locally at the client device 110.

The memory 240 includes a logging component 242. The logging component can be implemented using a variety of approaches. For example, the logging component 242 can be implemented as a standalone executable, a plug-in (e.g., for a web browser), or a background service. The logging component 242 can be implemented as software instructions (e.g., a JavaScript binary) which are executed by the application (e.g., a web browser) accessing the client-server application (e.g., a web-application). The software instructions may be embedded within the client-server application, and/or loaded simultaneously with the client server application.

The logging component 242 detects user interface events that occur within the graphical user interface 250. Upon detecting user interface events, the logging component 242 enters them into a log 244. A user interface event can be an operation performed by a user on a user interface element of the graphical user interface 250, or an effect caused by that operation to the user interface element or to some other user interface element within the graphical user interface 250.

An operation performed by the user on the user interface element may be referred to as an explicit action. Different types of input devices 202 can be used to perform different types of explicit actions. For example, a computer mouse can be used to perform explicit actions such as click, double-click, scroll, hover, drag and/or drop operations. Similarly, a keyboard can be used to perform explicit actions such as providing keystrokes corresponding to alphabet, numeral, arrow, function, and command keys.

The effect caused by an operation performed on a user interface element may be referred to as an implicit action. An implicit action is one which is not expressed directly by the user. As an example, the user may click on a first user interface element thereby selecting it. Subsequently, the user may click on a second user interface element thereby deselecting the first user interface element. That is, by explicitly selecting the second user interface element, the user implicitly deselects the first user interface element.

Changes in the visual appearance of the graphical user interface 250 may be referred to as display changes. Display changes can be the result of explicit and/or implicit actions.

The logging component 242 may provide an application programming interface ("API") to send and receive information. As an example of receiving information, the logging component 242 can receive parameterization commands via the API.

A parameterization command can be used to set a level of detail for the user interface events which are entered into the log 244. For example, parameterization commands can be used to define the type of user interface events to be entered into the log 244.

Using parameterization commands, the logging component 242 can be configured to detect and enter into the log, a subset of user interface events. Detecting and/or entering a subset of events into the log 244 may be referred to as sampling. The level of detail of sampling is referred to as a sample rate.

The logging component 242 may sample user interface events at a default sample rate. However, the default sample rate may be altered via a parameterization command. The sample rate (e.g., the default sample rate) may be altered in response to other conditions. For example, the sample rate may be altered (e.g., lowered or increased) in response to network conditions (e.g., connection speed) and the total wished bandwidth.

As an example of sampling at a particular sample rate, the logging component 242 may be instructed to detect and/or enter into the log 244, events that occur anywhere in the entire graphical user interface 250. As another example, the instruction may be directed to only a specific user interface element and/or surface area of the graphical user interface 250. The instruction may be directed to a particular type of event, or a subset thereof. For example, the instruction may be directed to 100% of user interface events of a first type, 50% of user interface events of a second type, 5% of events of a third type, and so on.

The logging component 242 can also enter into the log 244, temporal, session-related, and/or environmental information. As an example of temporal information, the logging component 242 can include in the log 244 a timestamp for user interface events. The timestamp corresponds to the time, at which the user interface event occurs on the client device 110.

As an example of session-related information, the logging component can include in the log 244, an identifier associated with a particular session. The identifier associated with the session may be generated by the server 170 at the outset of a user's interaction (session) with the graphical user interface 250. A session identifier may be associated with one or more user interface events.

As an example of environmental information the logging component 242 may include information related to the software and/or the hardware of the client device 110. For example, the logging component 242 can include a listing of the hardware specifications, including but not limited to the resolution of the display 204, the speed of the processor 220, and the size of the memory 240. The information related to the software can include a listing of software, including the firmware, installed on the client device 110.

The logging component 242 can increment counter values in response to occurrences of user interface events. For example, the logging component 242 may increment a counter value corresponding to an event entry number which is assigned to each user interface event entered into the log. Based on the event entry number, the entries in the log 244 may be arranged in a sequential order.

The logging component 242 can also increment a counter value based on interaction with a particular user interface element. For example, upon detecting an operation performed on a particular user interface element, the logging component 242 can increment a counter value associated with how often a user interacts with that user interface element.

The logging component can also increment counter values for particular types of events. For example, upon detecting a click on a particular user interface element, the logging component 242 can increment the counter value associated with the total number of click operations performed in a session.

The log 244 can be sent to the server 170. The log 244 can be sent in response to a request received from the server 170, in response to a condition at the client device 110, or at specified intervals. The conditions and/or intervals may be configured at the client device 110 by the user. The conditions and/or intervals may be configured based on instructions received from the server 170. The conditions and/or intervals may be configured based on conditions (e.g., network conditions) detected by the logging component 242.

As an example of a condition, the log 244 can be sent to the server 170 based on the user's activity. For example, if the user ceases interaction with the client device 110, starts or exits an application, or initiates a shutdown, the log 244 can be sent to the server 170.

Intervals can be based on elapsed time, the number of user interface events, or the file size of the log 244. For example, the log 244 may be sent every hour, every 100 events, or when the file size reaches 1 megabyte. The intervals may be adjusted based on conditions (e.g., network conditions) detected by the logging component 242.

The logging component 242 may process the log 244 before sending it to the server 170. For example, the logging component 242 may compress and/or encrypt the log 244 before sending it to the server 170. As another example, the logging component 242 may truncate the log 244 and/or divide it into smaller files.

The processor 220 of the client device 110 is configured to execute instructions, such as instructions physically coded into the processor 220, instructions read from the memory 240, or a combination of both. As an example, based on the instructions read from the memory 240, the processor can be configured to execute a method for logging graphical user interface events.

Once the instructions from the memory 240 are loaded, the processor 220 is configured to receive from a server 170, an identifier for a user interface element of a graphical user interface (e.g., 250). The processor 220 is further configured to detect a plurality of user interface events associated with the user interface element. The processor 220 is further configured to enter into a log (e.g., 244), for each of the detected user interface events, the identifier for the user interface element and the respective user interface event associated with the user interface element. The processor is further configured to send the log (e.g., 244) to the server (e.g., 170).

The server 170 includes a memory 280, a processor 260, and a communications module 262. The memory includes software instructions that can be read by the processor 260 to implement a logging module 282. The logging module 282 generates identifiers for user interface elements of the graphical user interface 250. The logging module 282 provides the identifiers to a logging component 242 on a client device 110. The logging module 242 on the client 110 is configured to detect user interface events associated with the user interface elements. The logging component 110 on the client is further configured to enter into the log 244, the user interface events and the corresponding identifiers for the user interface elements. The logging module 282 receives the log 244 from the logging component 242. Based on the received log 244, the user interface events associated with the user interface element can be replayed.

The server 170 is connected to the network 140 via a communications module 262. The communications module 262 is configured to interface with the network 140 to send and receive information, such as data, requests, responses, and commands to other devices on the network 140. The communications module 262 can be, for example, a modem or Ethernet card.

The processor 260 of the server 170 is configured to execute instructions, such as instructions physically coded into the processor 260, instructions read from the memory 280, or a combination of both. As an example, based on the instructions read from the memory 280, the processor 260 can be configured to execute a method for logging graphical user interface events.

Once the instructions from the memory 280 are loaded, the processor 260 is configured to generate an identifier for a user interface element of a graphical user interface (e.g., 250). The processor 260 is further configured to provide the identifier to a logging component (e.g., 242) on a client device (e.g., 110). The logging component (e.g., 242) is configured to detect on the client (e.g., 110) a user interface event associated with the user interface element, and enter into a log (e.g., 244), the user interface event associated with the user interface element. The processor 260 is configured to receive the log (e.g., 244) from the logging component (e.g., 242) on the client device (e.g., 110). The processor 260 is further configured to replay, based on the received log (e.g., 244), the user interface event associated with the user interface element.

Figure 3:
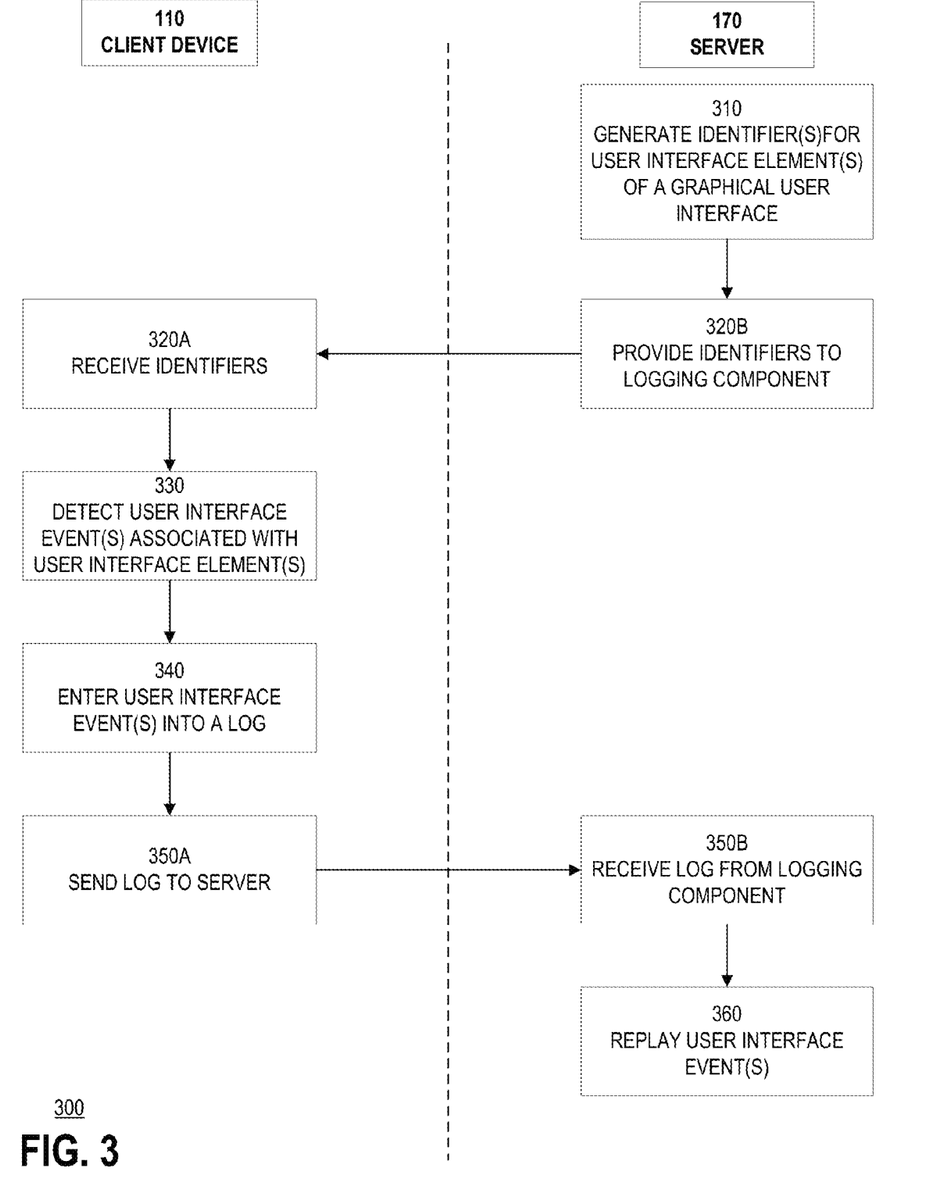
FIG. 3 illustrates an example of a process for logging graphical user interface events.

FIG. 3 illustrates an example of a process 300 for logging graphical user interface events. In step 310, an identifier for a user interface element of a graphical user interface 250 is generated. In steps 320A and 320B, the identifier is provided by the server 170 and received by the client device 110. In step 330, a user interface event associated with the user interface element is detected. The user interface event associated with the user interface element can be an operation performed on the user interface element (e.g., an explicit action) or an effect caused by the operation performed on the user interface element (e.g., an implicit action). In step 340, the identifier for the user interface element, and the user interface event are entered into the log 244. In steps 350A and 350B, the log 244 is sent by the client device 110 and received by the server 170. In step 360, the log 244 is used to replay the user interface event.

Figure 4A:
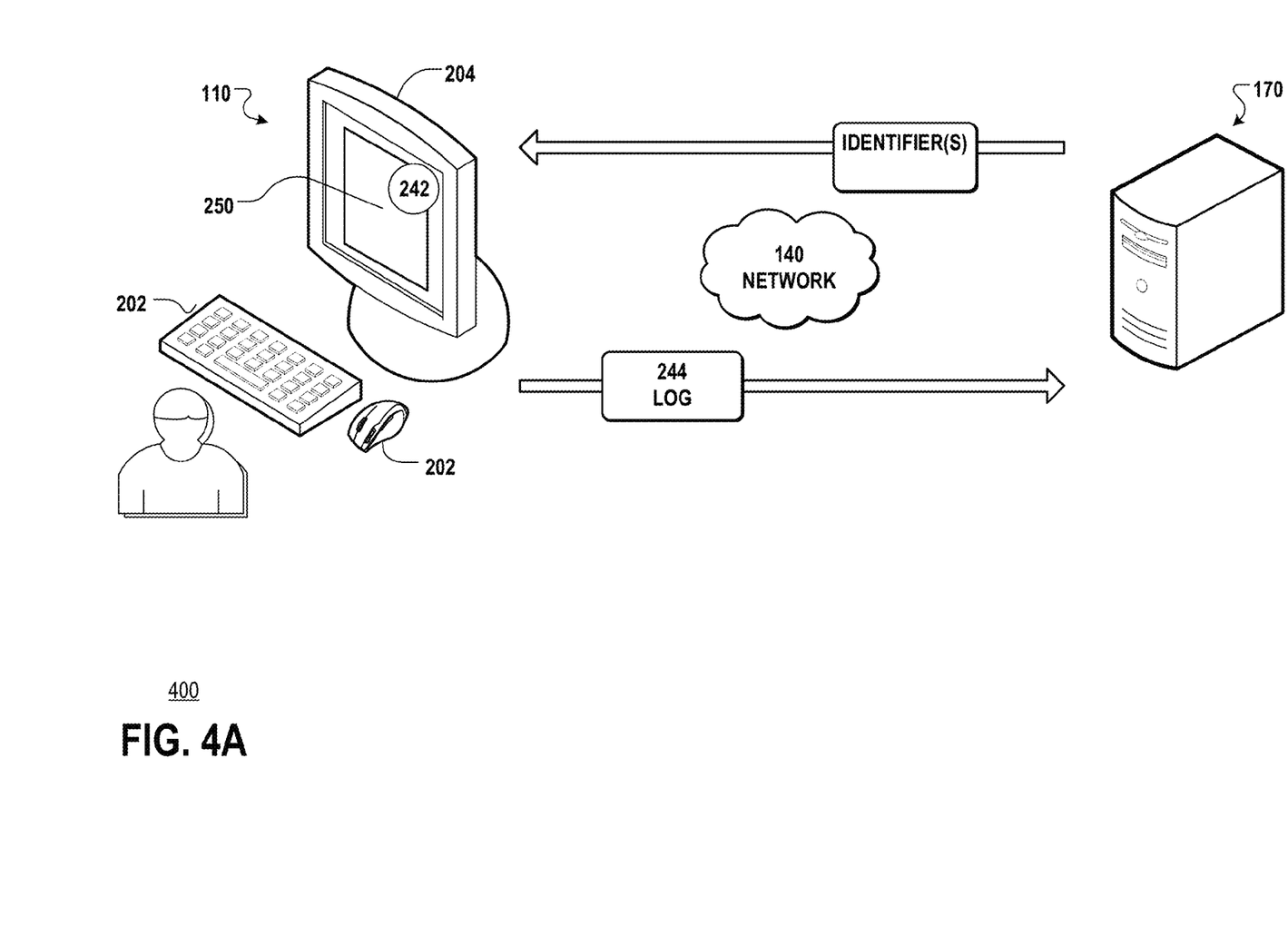
FIG. 4A is an illustration of a client device and a server associated with the example of the process of FIG. 3.

An example will now be described using the example of the process 300 of FIG. 3. In this example, illustrated in FIG. 4A, a desktop computer will be used as the client device 110, and a user interface of a web-based mapping application will be used as the graphical user interface 250. The desktop computer 110 has installed on it as a web browser plug-in, the logging component 242.

Figure 4B:
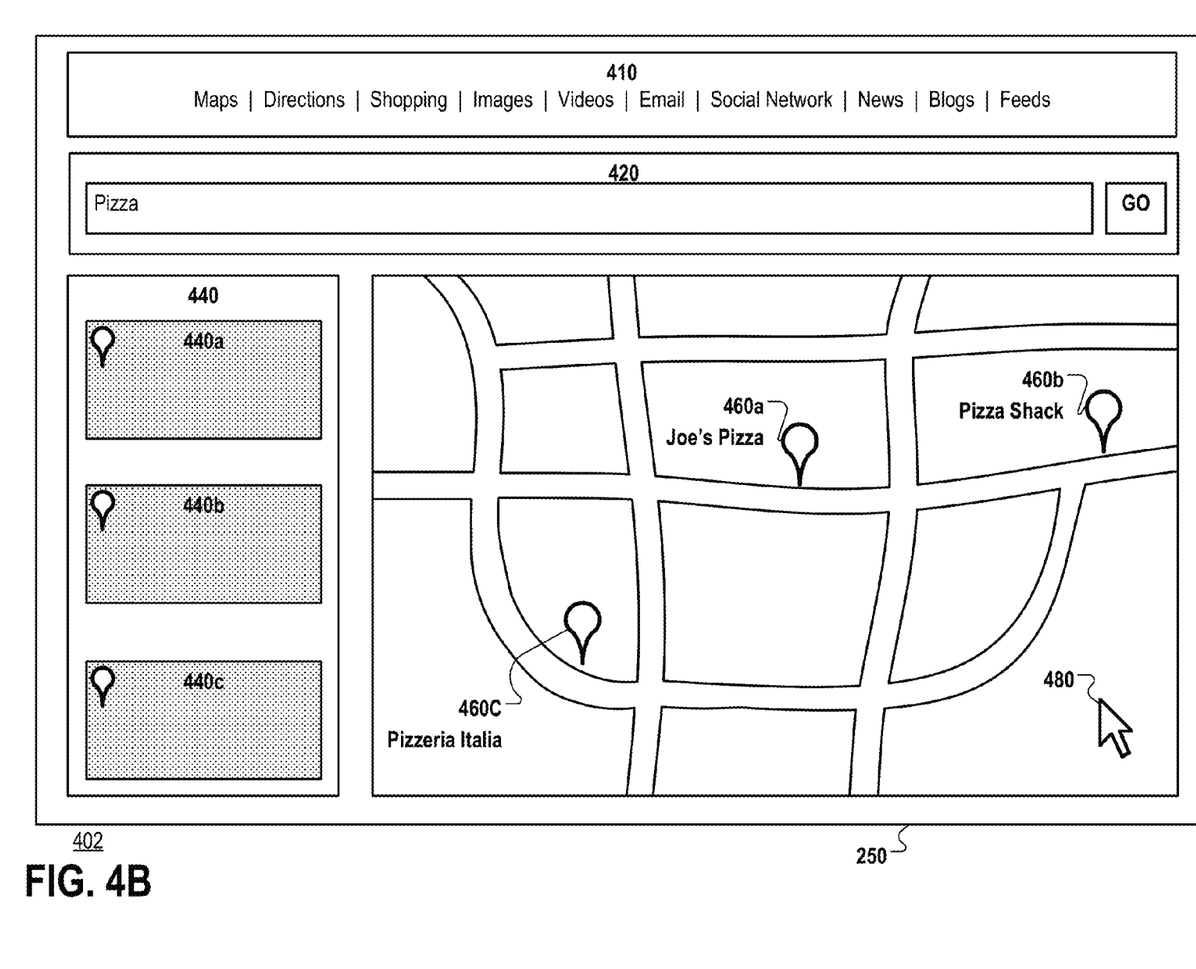
FIG. 4B is an illustration of a graphical user interface of a client-server application.

The process begins when a user uses a web browser on the desktop computer 110 to access the mapping application to perform a location-based search for pizza. The user interface 250 of the web-based mapping application is displayed on the display 204 of the desktop computer 110. The user interface 250 is illustrated in FIG. 4B.

In step 310, the server 170 generates identifiers corresponding to the various user interface elements of the mapping application 250. In this example, the server generates an identifier 410 for a navigation menu, an identifier 420 for a search box, an identifier 440 for an area for providing search results, and an identifier 460 for an area for displaying text, images, and other visual data related to the search results.

The server also generates identifiers for the various sub-elements of the user interface elements. In this example, three search results are displayed as sub-elements of the user interface element 440. The server 170 generates identifiers 440a, 440b, and 440c, for these sub-elements. Similarly the server 170 generates identifiers 460a, 460b, and 460c for sub-elements of user interface element 460.

Figure 4C:
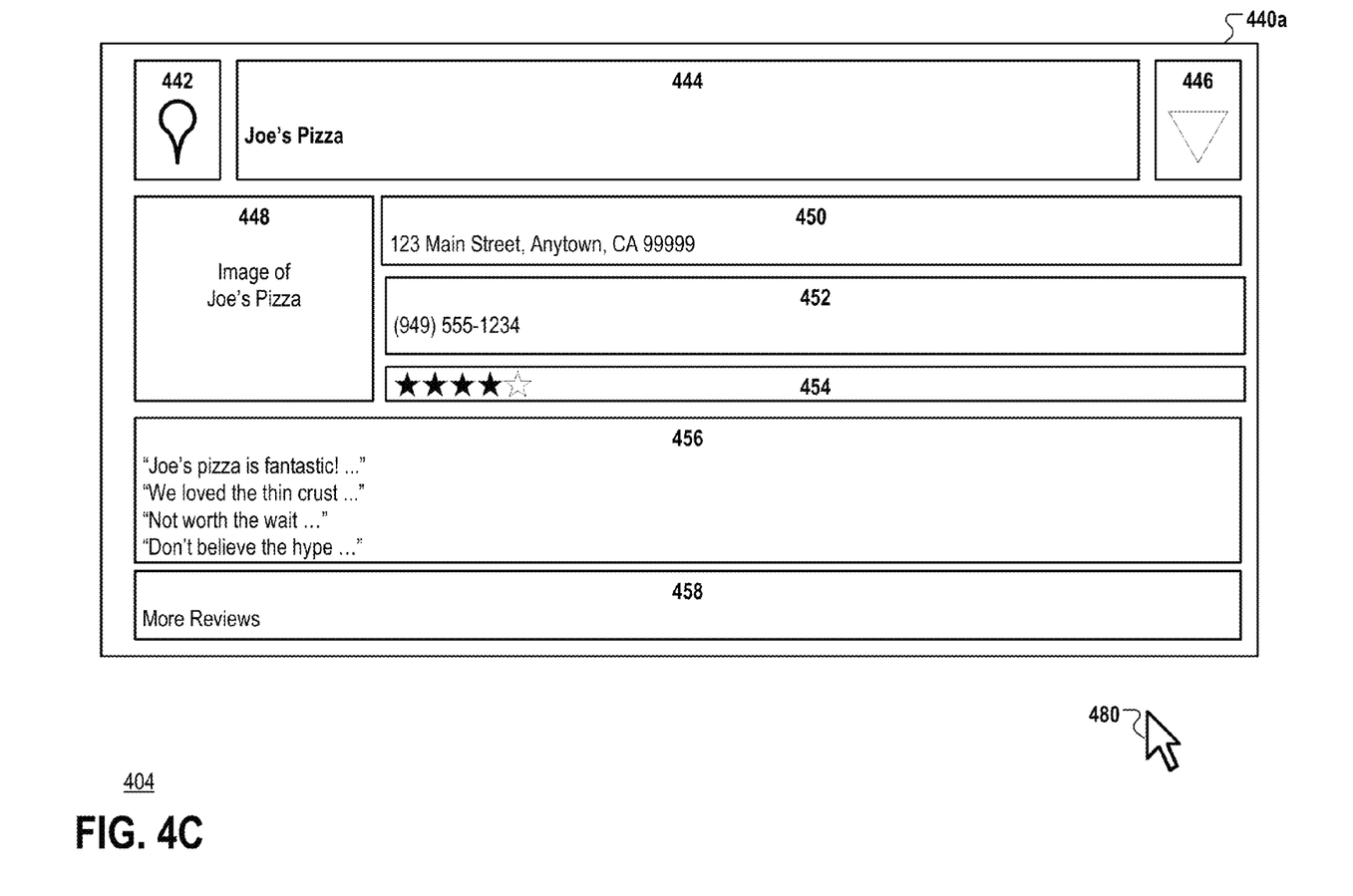
FIG. 4C is illustration providing additional details of one of the user interface elements of the graphical user interface of FIG. 4B.

Sub-elements may further contain other sub-elements. The server 170 generates identifiers for these sub-elements as well. For example, interface sub-element 440a is displayed in greater detail in FIG. 4C. As illustrated in FIG. 4C, the server generates identifiers 442, 444, 446, 448, 450, 452, 454, 456, and 458 for the sub-elements of sub-element 440a.

Referring again to FIG. 4B, user interface element 460 displays text, images, and other visual data related to the results of the search query. User interface element 460 displays information in layers. The layers correspond to search results, geographical information, and other visual representations of information. Geographical information can include map tiles, satellite images, relief maps, two-dimensional maps, or three dimensional maps. Other layers can visually represent information related to traffic and weather.

One of the layers in user interface element 460 includes markers corresponding to the search results displayed in user interface element 440. In this example, interface sub-elements 460a, 460b, and 460c are geographical markers that correspond to the locations of the three pizza restaurants listed in sub-elements 440a, 440b, and 440c respectively.

In steps 320A and 320B, the identifiers are provided by the server 170 and received by the desktop computer 110. In step 330, the logging component 242 detects user interface events.

The user is interested in learning more about Joe's Pizza which is provided in interface element 440a. The user uses the mouse pointer 480 to hover over user interface sub-element 440a. The logging component 242 detects the movement of the mouse 202, and the hover event associated with user interface element 440a. The details of user interface element 440a are provided in more detail in FIG. 4C.

As illustrated in FIG. 4C, user interface sub-element 440a further includes a sub-element 442 which is a pointer to the geographical location of Joe's Pizza, a sub-element 444 displaying the name Joe's Pizza, a sub-element 446 providing a dropdown menu, a sub-element 448 providing an image of Joe's Pizza, a sub-element 450 providing an address for Joe's Pizza, a sub-element 452 providing a phone number for Joe's Pizza, sub-element 454 providing a restaurant rating for Joe's Pizza, a sub-element 456 providing excerpts of reviews, and sub-element 458 which provides a link to additional reviews of Joe's Pizza.

The user reads the excerpts of reviews provided in sub-element 456. The user then clicks on the pointer 442 to the geographical location of Joe's Pizza. The logging component 242 detects the user's explicit action of clicking on sub-element 442. As a result of the click, the mapping application highlights the corresponding geographical marker 460a.

The highlighting of the corresponding geographical marker 460*a* is an example of an implicit action. This implicit action is also detected by the logging component 242.

The user then clicks and drags to the left, the map area displayed in user interface sub-element 460. In doing so, the user's explicit actions include the click and drag operations associated with user interface element 460. The user performs these operations to view pizza restaurants that may be located to the right of user interface sub-element 460*b*, which is the geographical marker for Pizza Shack.

As the user clicks and drags the map area 460 to the left, sub-element 460*c*, which is the geographical marker for Pizzeria Italia, exits the visible area of user interface element 460. That is, sub-element 460*c* is no longer displayed. As sub-element 460*c* disappears, the corresponding search result provided in sub-element 440*c* also disappears.

These changes in visibility of user interface elements are also detected by the logging component 242.

In step 340, the logging component 242 enters into the log 244, the identifiers for user interface elements, and the user interface events associated with the user interface elements.

In entering the user interface events into the log 244, the logging component 242 can use identifiers to selectively describe the user interface elements, sub-elements, and layers of the graphical user interface 250 at various levels of abstraction, or detail, regardless of whether they are visible to the user. Consequently, the log 244 can be created at various levels of abstraction, or detail. The logging component can also include an identifier for the type of application. In this example, the letter M is used as an identifier for the mapping application.

Thus, at one level of abstraction, the initial state of the user interface of the mapping application can be described as M{400, 420, 440, 460}. Interface elements 440 and 460 may be similarly described as 440 {440*a*, 440*b*, 440*c*} and 460 {460*a*, 460*b*, 460*c*}. Thus, at a more detailed level of abstraction, the user interface 250 of the mapping application may be described as M {400, 420, 440 {440*a*, 440*b*, 440*c*}, 460 {460*a*, 460*b*, 460*c*}}. At an even more detailed level, the user interface 250 may be described as M{400, 420, 440 {440*a* {442, 444, 446, 448, 450, 452, 454, 456, 458}, 440*b*, 440*c*}, 460 {460*a*, 460*b*, 460*c*}}.

When the user hovers the mouse pointer 480 over the search result for Joe's Pizza displayed in user interface sub-element 440*a*, the logging component 242 enters the detected hover event into the log 244.

An event associated with a user interface element may be expressed using a path to that user interface element. The path to a user interface element is expressed hierarchically. For example, the path to user interface sub-element 440*a* may be expressed as M/440/440*a* or M/440[1]. Thus, as an example, the hover event may be entered into the log 244 as "hover M/440/440*a*" or "hover M/440[1]."

An event associated with a user interface element may be expressed using a description of the user interface at a particular abstraction level. For example, the hover event may be entered into the log 244 as M{400, 420, 440 {Hover 440*a*, 440*b*, 440*c*}, 460 {460*a*, 460*b*, 460*c*}}.

When the user clicks on the map area 460 and drags it to the left, the logging component 242 adds entries for the click and drag operations to the log 244. As a consequence of the click and drag operations, the graphical marker 460*c* for Pizzeria Italia sub-elements and the corresponding search result 440*c* disappeared. These changes in visibility are also entered into the log 244.

The logging component 242 expresses changes in visibility using plus ("+") and minus ("−") symbols. The logging component 242 expresses an appearance using a plus ("+") symbol and a disappearance using a minus ("−") symbol. In this example, the disappearance of interface sub-elements 440*c* and 460*c* may be expressed in the log 244 as −440*c* and −460*c*.

Similar to the hover event described above, changes in visibility may also be expressed using paths or a description of the user interface at a particular abstraction level. For example, using the path, the disappearance of interface sub-element 460*c* can be expressed as −M/460/460*c*, or −M/460[3]. Similarly, the disappearance of interface sub-element 440*a* can be expressed as −M/440/440*a*, or −M/440[3].

Changes in visibility can be expressed using a description of the interface at a level of abstraction. For example, the disappearance of interface sub-elements 440*c* and 460*c* can be expressed as M{400, 420, 440 {440*a*, 440*b*, −440*c*}, 460 {460*a*, 460*b*, −460*c*}}.

The user decides to visit Joe's Pizza, and closes the web browser. In step 350A and 350B, the log 244 is sent by the client device 110 and received by the server 170. While in this example, the log 244 is sent at the end of the user's session, the log 244 may be sent at any time during the session as well.

In step 360, the log 244 is used to replay the user interface event. That is, using the log 244, the hover, click and drag operations, and the corresponding changes in visibility are replayed.

Figure 5:
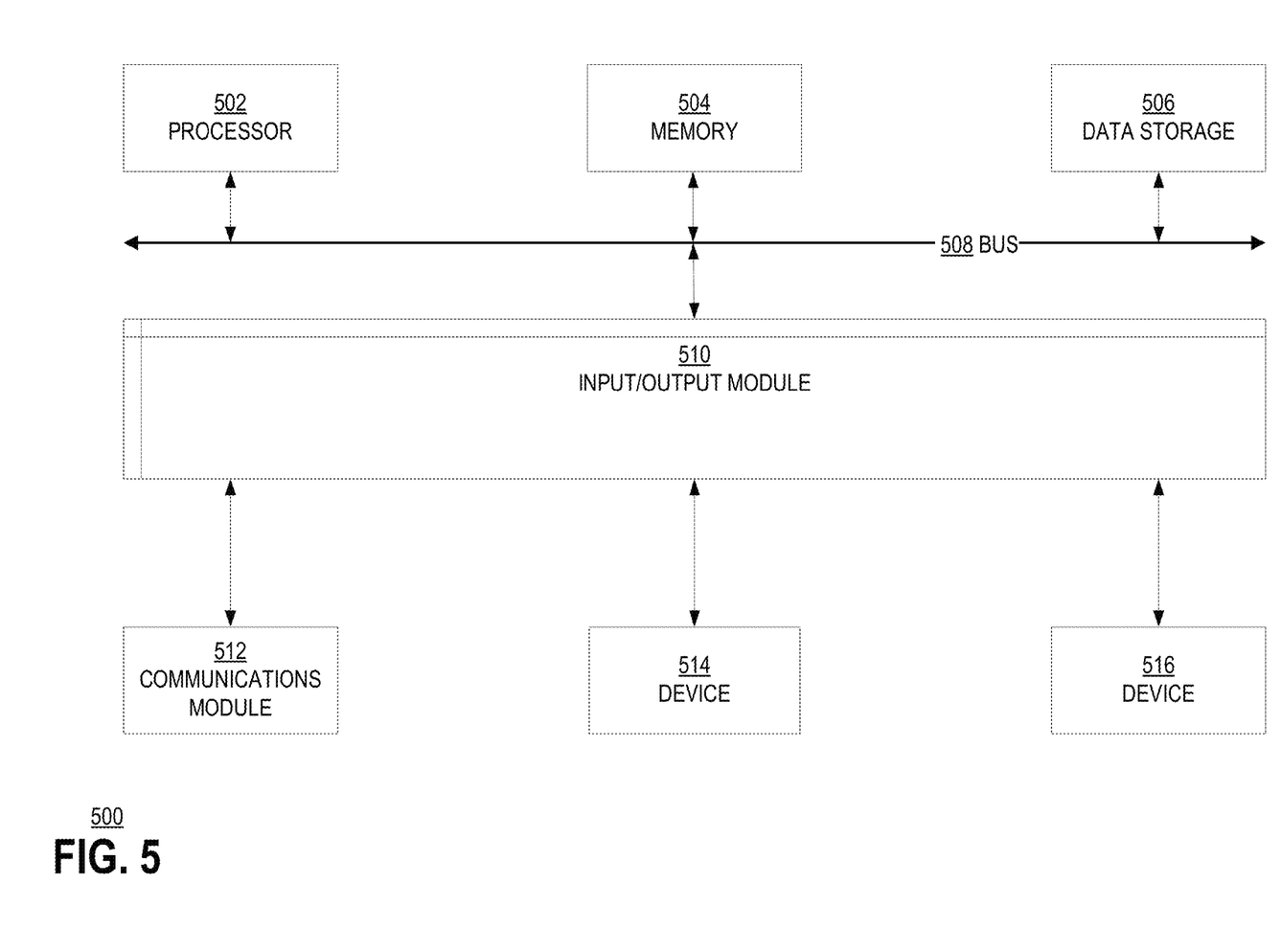
FIG. 5 conceptually illustrates an electronic system with which some aspects of the subject technology can be implemented.

FIG. 5 conceptually illustrates an electronic system with which some aspects of the subject technology can be implemented. For example, FIG. 5 illustrates an example of a computer system 500 with which the client device 110 or the server 170 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client device 110, server 170) includes a bus 508 or other communication mechanism for communicating information, and a processor 502 (e.g., processor 220, processor 260) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 240, memory 280), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Examples of input/output modules 510 include data ports such as USB ports. The input/output module 510 is configured to connect to a communications module 512. Examples of communications modules 512 (e.g., communications module 222, communications module 262) include networking interface cards, such as Ethernet cards and modems. In certain aspects, the input/output module 510 is configured to connect to a plurality of devices, such as an input device 514 (e.g., input device 202) and/or an output device 516 (e.g., output device 204). Examples of input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Examples of output devices 516 include display devices, such as a CRT (cathode ray tube) or LCD (liquid crystal display) monitor, for displaying information to the user.

According to one aspect of the present disclosure, the client device 110 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 140) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that include bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate implementations of the subject technology can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for logging client-side events of a graphical user interface for a client-server application, the method comprising:
  displaying, by one or more computing devices, on a client device a graphical user interface for a client-server application, wherein the graphical user interface comprises a mapping application having a plurality of user interface elements within the mapping application comprising at least one of a navigation menu, a search box, an area for providing search results, or an area for text, images, and wherein each of the plurality of user interface elements has an identifier communicated to the client device by a server;
  detecting, by the one or more computing devices, a first user interface event comprising an explicit user interaction with a first user interface element of the plurality of user interface elements, the first user interface event comprising a client-side user interface event performed without communication with the server;
  generating, by the one or more computing devices, a first log entry in a log stored on the client device, wherein the first log entry comprises the first user interface event and the respective identifier associated with the first user interface element;
  updating, by the one or more computing devices, one or more of the plurality of user interface elements in the displayed graphical user interface in response to the first user interface event, wherein the updating of the one or more of the plurality of user interface elements in the displayed graphical user interface corresponds to a second user interface event, the second user interface event corresponding to an implicit action performed in response to the first user interface event, the second user interface event comprising a client-side user interface event performed without communication with the server;
  generating, by the one or more computing devices, a second log entry in the log stored on the client device, wherein the second log entry comprises the second user interface event and the respective identifier for each of the one or more of the plurality of user interface elements updated in the second user interface event; and
  sending, by the one or more computing devices, the log stored on the client device to the server.

2. The computer-implemented method of claim 1, wherein the first log entry corresponds to a first type of user interface event, and wherein the first log entry is generated in the log based on a parameterization command identifying the first type of user interface event to be generated into the log.

3. The computer-implemented method of claim 1, wherein the first log entry and the second log entry are generated into the log at a sample rate which is based on a parameterization command.

4. The computer-implemented method of claim 1, further comprising:
  incrementing a first counter value in response to the first user interface event; and
  including in the first log entry, the first counter value indicating a count of occurrences of the first user interface event.

5. The computer-implemented method of claim 1, further comprising:
  incrementing a second counter value in response to the second user interface event; and
  including in the second log entry, the second counter value indicating a count of occurrences of the second user interface event.

6. The computer-implemented method of claim 1, wherein the updating comprises at least one of an appearance or disappearance of the one or more of the plurality of user interface elements in the displayed graphical user interface.

* * * * *